(12) United States Patent
Gray, Jr.

(10) Patent No.: US 8,893,491 B2
(45) Date of Patent: Nov. 25, 2014

(54) MODULAR HYDRAULIC HYBRID DRIVETRAIN

(75) Inventor: Charles L. Gray, Jr., Pinckney, MI (US)

(73) Assignee: The United States of America, as represented by the Administrator of the U.S. Environment Protection Agency, Washington, DC (US)

(*) Notice: Subject to any disclaimer, the term of this patent is extended or adjusted under 35 U.S.C. 154(b) by 516 days.

(21) Appl. No.: 13/415,109

(22) Filed: Mar. 8, 2012

(65) Prior Publication Data

US 2012/0227393 A1 Sep. 13, 2012

Related U.S. Application Data

(60) Provisional application No. 61/451,274, filed on Mar. 10, 2011.

(51) Int. Cl.
| | |
|---|---|
| *B60K 6/12* | (2006.01) |
| *B60K 17/10* | (2006.01) |
| *F16H 39/00* | (2006.01) |

(52) U.S. Cl.
CPC . *B60K 6/12* (2013.01); *B60K 17/10* (2013.01); *Y02T 10/6208* (2013.01); *B60Y 2304/072* (2013.01); *B60Y 2410/00* (2013.01); *F16H 2039/005* (2013.01)
USPC ................................. 60/487; 29/888

(58) Field of Classification Search
USPC .................. 60/487; 29/888; 180/165
See application file for complete search history.

(56) References Cited

U.S. PATENT DOCUMENTS

| | | | | |
|---|---|---|---|---|
| 3,775,981 | A * | 12/1973 | Molly | 60/490 |
| 4,252,508 | A * | 2/1981 | Forster | 91/499 |
| 7,537,075 | B2 * | 5/2009 | Gray et al. | 180/165 |
| 7,984,783 | B2 * | 7/2011 | Gray et al. | 180/307 |
| 2006/0021813 | A1 * | 2/2006 | Gray, Jr. | 180/165 |

* cited by examiner

*Primary Examiner* — Thomas E Lazo
(74) *Attorney, Agent, or Firm* — David H. Read (57) ABSTRACT

A drive module for a hydraulic hybrid vehicle includes two variable displacement over-center bent-axis hydraulic pump/motors with respective yokes that reside and pivot within a common fluid-filled case. The cylinder barrel of each pump/motor is connected to high pressure through fluid-conducting yoke legs, and is connected to low pressure through the fluid-filled case, which is connected by a port to a low pressure source. As a drivetrain for a vehicle, one pump/motor acts primarily as a pump driven by an engine and the other pump/motor acts primarily as a motor to propel the vehicle. A removable support structure facilitates installation to a variety of vehicle chassis.

24 Claims, 8 Drawing Sheets

MODULAR HYDRAULIC HYBRID DRIVETRAIN

RELATED APPLICATIONS

This application claims priority to U.S. Provisional Application 61/451,274, "Integrated Hydraulic Hybrid Drive Module," filed Mar. 10, 2011.

BACKGROUND OF THE INVENTION

1. Technical Field

The disclosed embodiments are directed generally to fluid power systems employing over-center pump/motors, and, in particular, to hydraulic hybrid vehicles.

2. Description of the Related Art

In configuring a series hydraulic hybrid vehicle, typically there will be at least one pump/motor acting primarily as a pump to convert mechanical power to hydraulic power, and at least one other pump/motor acting primarily as a motor to propel the vehicle. There arises the problem of packaging these units in a way that is economical in terms of cost, weight, and volume. In particular, each pump/motor must be provided with a high-pressure connection and a low-pressure connection. These are usually provided by heavy-duty hydraulic hoses that are bulky, stiff, and difficult to route past other components on the vehicle.

Further, in the development of any motor vehicle, economy of scale is always sought in order to minimize cost of production. No matter what components are employed, the market size for a given type of vehicle determines the degree to which production quantities can result in sufficient economy of scale to make the vehicle marketable to its intended users.

Hydraulic hybridization is particularly well suited to heavy-duty vehicles, due to the high power capability afforded by hydraulic drive components and the fact that such vehicles consume a lot of fuel. However, in contrast to light-duty passenger cars, which are sold in large quantities to the general public, the market for heavy-duty vehicles such as trucks, buses, and industrial vehicles is fragmented into relatively small segments of relatively low production volume. Each segment may in turn include many distinct specialty products produced in small quantities. Often, products such as buses and delivery vehicles are produced as generic chassis packages by one manufacturer and are then sold to a variety of aftermarket vendors to be fitted with specialty coachwork suited to a specific niche market or application.

This market fragmentation puts heavy-duty vehicles at an economic disadvantage for hybridization. It makes it unlikely that any single model of heavy-duty vehicle can achieve sufficient production quantities to allow large economies of scale to develop for the specialty components needed for its hybridization.

This problem could be alleviated by providing a modular hydraulic hybrid drivetrain that can be installed in a diverse variety of individual heavy duty vehicle models. Production volumes for the components in the modular drivetrain could then be expanded across multiple vehicle product lines, allowing economies of scale to develop more effectively, at least for the modular drivetrain.

Another goal to reduce hydraulic hybridization costs would be the elimination of many of the hoses and external fluid connections presently necessary for fluid routing. By bringing most fluid routing into the interior of the device, parts count and assembly labor would be reduced, while safety, simplicity, and ease and cost of installation would be improved.

The goal of a practical and affordable modular hydraulic drivetrain presents many difficult technical hurdles. Aside from the task of effectively integrating the necessary components, it would be necessary to maintain ease of installation by a variety of line personnel across a variety of chassis configurations. A modular hydraulic drivetrain, with its accumulators and auxiliary connections, would have to be easily transportable as a unit to any assembly factory in any part of the world, and easily transported within the factory. It would also be necessary to minimize installation time to be compatible with the movement of an assembly line. Because fluid handling capability is often not present on a vehicle production line that does not normally install hydraulic components, it would be preferable to provide a pre-plumbed, fully primed unit. To be applicable to the broadest possible number of host chassis, the structural and volumetric requirements for the host chassis and the degree of custom adaptation necessary should be minimized.

In U.S. Patent Application 2009/0172942 (Hindle), "Integrated Hydraulic Hybrid Drive Module and Method of Installing Same", there is disclosed a method of providing a modular hydraulic hybrid drivetrain by packaging the necessary drivetrain components on a modular platform that can be installed permanently on a vehicle chassis. A product made after this description has been offered commercially by Parker Hannifin Corporation. In contrast with the present invention, Hindle does not place the engine pump and drive motor(s) in a common case. In addition, the Hindle application is oriented to a permanent support structure that becomes part of the vehicle, and is mounted primarily to one side of a vehicle frame. The preferred embodiment of the present invention is instead oriented toward a removable support structure that does not become part of the vehicle, and carrying a modular series powertrain that mounts near the center of the vehicle in a position similar to a normal vehicle driveline.

OBJECT OF THE INVENTION

It is an object of the invention to provide the primary components of a hydraulic hybrid drivetrain in a single self-contained integrated drive module.

It is another object of the invention to provide an integrated drive module that is compatible with the broadest possible variety of vehicle chassis without need for major modification of either the drive module or the host chassis.

It is another object of the invention to provide an integrated drive module that may be installed within the expected time constraints of an assembly line, with minimum requirements for special training or special equipment, and without requiring fluid handling capabilities such as bleeding or purging in order to be successfully installed at the assembly line.

It is another object of the invention to provide an integrated drive module that is economical in terms of cost, size, and weight.

It is another object of the invention to provide a modular drivetrain with a removable support structure to support the various components of the drivetrain for shipment to, and transport within, a vehicle assembly facility, and fitting to a vehicle therein.

SUMMARY OF THE INVENTION

According to the present invention, a modular hydraulic drivetrain for a motor vehicle is provided. An integrated drive module (IDM) for a hydraulic hybrid vehicle includes a hydraulic drive unit (HDU), a high-pressure accumulator, a low-pressure reservoir, and related support systems, preferably packaged on a removable support structure (RSS) that facilitates its shipment as well as its installation to a vehicle chassis either at a vehicle assembly plant or as a retrofit to an existing chassis or vehicle.

A preferred embodiment of the HDU includes two bent-axis, over-center pump/motors housed within a single fluid-filled case, in a "back-to-back" configuration in which the yoke of each pump/motor pivots independently within the fluid-filled volume of the case. High pressure is conducted to and from the respective cylinder barrel of each pump/motor by means of a fluid carrying yoke leg, while low pressure is conducted via a port in the yoke back plate that is open to the fluid volume within the case.

This back-to-back arrangement allows for the low pressure return flow of one pump/motor, when acting as a motor, to help supply the low pressure input of the other pump/motor, when acting as a pump, without the need to direct this portion of the flow outside of the case. If the two pump/motors did not share a common wet case, this portion of flow would have to be conducted through an external low pressure line and low pressure manifold, which may now be eliminated. This minimizes the number of external hoses by eliminating the need for low pressure connections between the motors.

The back-to-back arrangement also has the advantage of allowing both pump/motors to be provided with low pressure by means of the common case, allowing the module to have a single primary low-pressure connection rather than the two connections that would otherwise be necessary to supply each pump/motor individually. The elimination of these external low pressure lines also reduces the envelope of the package and reduces the difficulty of routing hoses around chassis components.

Yet another advantage is in the ability to have only one primary high-pressure connection to the module, with the high-pressure flow being distributed to the high-pressure yoke leg of each pump/motor by means of an integrated high pressure fluid manifold. The module may then be installed with a single high-pressure connection rather than the multiple high-pressure connections that would otherwise be necessary if the pump/motors were not integrated. On a production line, it is desirable to minimize the number of high-pressure connections because these connections demand the greatest care in installation due to the potentially dangerous pressures involved.

To achieve the benefits of this back-to-back arrangement, over-center bent-axis pump/motors are the best candidates, since the location of the high pressure attachment and routing to the power-producing barrel and pistons is dedicated to one supply route, in contrast to one-sided pump/motors which must shift high and low pressure from one supply point to the other in order to shift from pump mode to motor mode and from motor mode to pump mode. In addition, an over-center pump/motor always receives and discharges low pressure through one supply route, which may be located in the barrel back plate to direct fluid flow directly to and from the barrel housing, thus reducing inefficiencies associated with a changing low pressure supply route. With low pressure from the housing/case providing feed to the pump/motor barrel through a simple low-pressure port open to the case volume, two (or more) pump/motors can thus share a common low pressure fluid-filled housing/case, easily enabling the unique aspects of the invention. Further, the resulting module can easily include filtration and cooling circuits, and a mechanism for deaeration of the hydraulic fluid, integrated thereto, avoiding the need for additional external hoses and connections that would otherwise be required.

In another embodiment of the HDU, the use of a low pressure manifold allows the use of a dry case rather than a fluid-filled case. A dry case would substantially eliminate the frictional losses of the pump/motor rotating components that would otherwise be spinning within fluid if the case were fluid filled. Also, the reduction of case pressure from even a low level to near atmospheric pressure would: (1) reduce the tension forces on the pistons and balls within their drive shaft sockets, thus reducing the cost and complexity of retention means, and (2) reduce the shaft seal loads and complexity to prevent leakage. Although a dry case would not realize the benefit of a shared low pressure fluid supply between the yokes in the case, it would benefit from the aforementioned reduced friction as well as retain the benefit of modularization.

The IDM is designed to be installed without need for purging, bleeding, or handling of hydraulic fluid. Target installation time on a prepared host chassis is about 15 minutes. No component disassembly is required for installation. Hydraulic connections are minimized to prevent the need for fluid handling capability on the assembly line. As shipped to the installer, the accumulators and the fluid system would be prefilled with hydraulic fluid. Optionally the accumulators may be precharged with nitrogen so that the system is ready to operate.

The IDM is preferably targeted to mid-sized heavy duty chassis, such as for example a midibus or shuttle bus, which typically employ a frame-rail substructure. The IDM employs attachment points that connect to the frame rails, with the IDM being placed generally between the rails, and the rails thereby supporting the bulk of the weight of the accumulators and the unit.

For installation on a host chassis, it is necessary to address the physical and dimensional compatibility of the system with the host chassis. The IDM is designed to be delivered on a removable support structure (RSS) for installation from top or bottom. The RSS is a rigid or semi-rigid structure that is adjustable, that serves to hold the components (the accumulators and the drive module) together while connections are made to the chassis. The components of the IDM use existing frame member attachment points whenever possible. The RSS may also support and/or allow assembly, fluid charging, air purging, functional verification, transport of the module to vehicle assembly, and correct positioning for easy vehicle installation to the host chassis.

Functional integration is another concern of installation and compatibility. A mating surface surrounding the output shaft of the drive motor allows mating of the IDM with various transmissions or similar speed or torque multiplication devices. For example, in a vehicle application, in order to propel the vehicle it is typically necessary to transmit motive power to a differential gear, which must rotate at some multiple of the speed of the wheels, a speed which will vary with vehicle speed. It is often advantageous to utilize a multi-gear transmission between the output shaft and the differential gear, so that by shifting the gear, the drive motor may operate at a more efficient speed than that of the differential gear. However, depending on the anticipated duty cycle of the vehicle, it may be preferable to provide this torque multiplication in a different manner or eliminate it entirely. For example, instead of a multi-gear transmission, one or more torque converters could be mounted on the module, so as to provide improved launch capability without the added complexity of multiple gears and a shift mechanism. Alternatively, one or more additional pump/motors may be mounted on the module, such as for example a through-shaft axial piston pump/motor, so that in some situations the output torque would be provided to the differential gear solely by the primary drive pump/motor, while in other situations such as high acceleration, additional torque assist could be provided by the additional pump/motor. As used in the claims herein, the term "power transmission means" therefore encompasses a multi-gear transmission, one or more torque converters, or one or more through-shaft pump/motors.

Because heavy duty vehicles are often used on an irregular basis, it is important that the system be robust after long term inactivity. The IDM can be designed to be self-booting. An electrically driven hydraulic pump can be used to supply high pressure to the pump/motor actuator circuit and prepositioning of the HDU to zero displacement prior to system startup. Additionally, zero-leakage shutoff valves are meant to minimize the need for back-up priming of the actuator circuit in most situations. The engine-driven pump/motor can be used to start the engine. The engine then pressurizes the air brakes if the vehicle is so equipped.

For thermal management and system filtration, a pump (for example, a gerotor-style pump) may be integrated into one or both of the integrated pump/motors (preferably the engine pump), packaged between the pump bearings (possibly as a cartridge), or driven by an external drive means to drive fluid through a cooling or filtration system. Alternatively, a low pressure manifold receiving the low pressure discharge of the drive motor may be used and integrated with the IDM to provide flow for filtration and cooling. A fluid deaeration system may also be integrated into the unit for ongoing removal of dissolved nitrogen from the hydraulic fluid to reduce the need for periodic fluid maintenance.

The IDM includes a high-pressure accumulator that is protected with a flow fuse and one or more on/off valves. The IDM may employ bladder or piston accumulators. For applications with a piston accumulator, a zero-leakage shutoff valve is preferred, in order to reduce the possibility of gradual leak-down during extended periods of non-use, which could damage some types of piston accumulators. The IDM also includes a low-pressure accumulator protected with an on/off valve and a parallel check valve.

For accessory support, on-demand power brakes and on-demand power steering may be provided hydraulically, by means of pressure-regulated access to the high pressure side of the system. The pressure regulators are integrated into the HDU and include a flow fuse at each feed port, with fluid return to the case through check valves.

DETAILED DESCRIPTION

Figure 1:
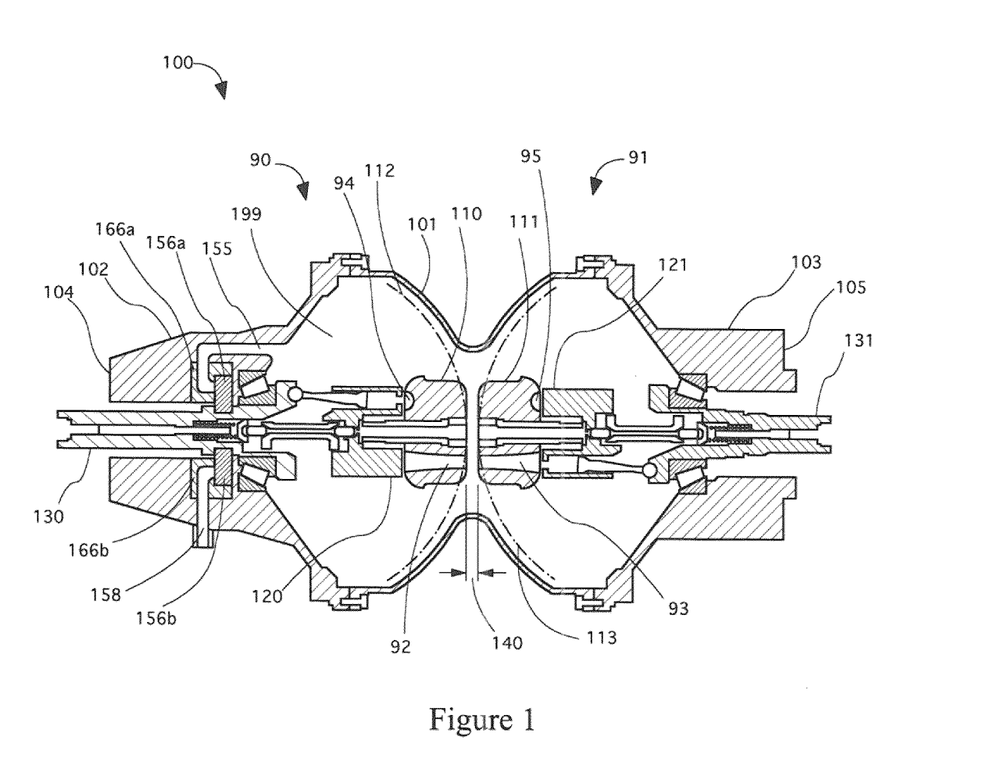
FIG. 1 is a sectional view of the primary pump/motors of the integrated drive module showing the two respective pump/motors united in a common wet case.

Referring now to FIG. 1, a hydraulic drive unit (HDU) 100 includes two integrated over-center bent-axis pump/motors 90, 91 which include respective cylinder barrels/rotating groups 120, 121 carried by respective yokes 110, 111. As is well known in the art, in a yoke-based pump/motor a pivoting yoke structure is configured to sweep the back plate along an arc as the yoke pivots about a trunnion, thereby changing the stroke of the pistons in the cylinder barrel, and thereby changing the displacement of the pump/motor. Here, the back plates of yokes 110, 111 sweep respective arcs 112, 113 as the respective yoke structures pivot, thereby changing the respective displacements. Clearance distance 140 is provided between yokes 110, 111 such that they are free to pivot independently without collision. Fluid-filled case 101, which may be constructed as a single piece or multiple pieces joined together, is filled with working fluid 199 that is in constant fluid communication with a low pressure source. Pump input shaft 130 may be joined to the output shaft of an engine (or other "mechanical power source"), with mating surface 104 available to facilitate mounting. Similarly, motor output shaft 131 may be joined to a "mechanical power output" (e.g., a transmission or other device to provide motive power to a vehicle), with transmission mating surface 105 available to facilitate mounting to a power transmission means. In this arrangement, pump/motor 90 may be understood as primarily an engine pump (although it may sometimes be used as a motor to start the engine), and pump/motor 91 as primarily a drive motor (although it may sometimes be used as a pump to perform regenerative braking).

Over-center bent-axis pump/motors 90, 91 are of the pivoting-yoke, wet-case type, which operate in a manner that will be familiar to anyone with an understanding of yoke-based bent-axis machines. This known operation will be briefly reviewed here without reference to figures. In these machines, high pressure fluid is provided to the cylinder barrel by means of a passage within a fluid-carrying yoke leg. A second structural yoke leg may also exist, which does not carry fluid but may be provided to stiffen and stabilize the yoke. The fluid-carrying yoke leg passage connects a high pressure port at the yoke trunnion to a kidney port that resides on the sliding interface between the cylinder barrel and the back plate. As the cylinder barrel rotates, this kidney port is thereby always placing a subset (roughly half) of the cylinders into fluid communication with the high pressure source. Simultaneously, low pressure is connected to the remaining group of cylinders by an opposite kidney port that simply connects the cylinders to the fluid residing in the case, usually by means of a simple open passage through the back plate. Providing low pressure in this very simple manner is possible because, in a wet-case design, the fluid-filled interior volume of the case is essentially an extension of the low pressure reservoir. Dry-case designs do not have this feature, and instead must access low pressure through a second fluid-carrying yoke leg, or by a sliding connection with a low pressure port embedded in the case. It will be seen that for these and other reasons, use of a wet-case design such as that described herein enables a preferred embodiment of the invention. Of course, even if a dry case design is used in the invention, advantages of modularization are still retained.

Referring again to FIG. 1, the high-pressure supply to respective cylinder barrels 120, 121 is depicted via high pressure ports 94, 95, which will be understood (as reviewed above) to represent cross sections of respective kidney ports that place a subset of cylinders in fluid communication with the high pressure source. For clarity, the fluid-carrying yoke leg and yoke trunnions are not shown, being understood as common elements of this type of pump/motor. Similarly, the low pressure supply to cylinder barrels 120, 121 is depicted via low pressure ports 92, 93, which will similarly be understood to connect the remaining group of low pressure side cylinders with the low pressure fluid of the case.

It is now clear that respective low pressure ports 92, 93 are also in fluid communication with each other, by means of the fluid-filled case. Therefore, any low pressure fluid being discharged from one pump/motor (at, for example, port 93) when it is acting as a motor will replace some or all of the fluid being drawn from the case by the other pump/motor (at for example port 92) when it is acting as a pump.

Preferably, the respective pump/motors 90 and 91 are situated in the HDU such that when both are in the same mode (either pump or motor), they are stroked to the same side of the case (i.e., in a side view facing the end of the trunnions, such as in FIG. 1, when a yoke is stroked in an "up" direction it might be in motor mode, with the opposite "down" direction indicating pump mode). By this arrangement, when the first pump/motor is acting as a pump and the second is acting as a motor (a very common mode of operation), the two units are stroked in opposite directions so that the discharge from the motor is some distance from the intake of the pump. This helps ensure that fluid flow from the discharging yoke to the intake yoke promotes good circulation in the interior space of the case. If the opposite arrangement were adopted, the fluid ports of the respective yokes may be very close together in some high flow scenarios, and there would be less opportunity for fluid from the discharging yoke to mix with fluid already in the case before entering the intake yoke. The advantage is in promoting fluid circulation within the case so as to attain a more uniform fluid temperature, or more consistent flow through a fluid conditioning means (such as cooling, filtration, or deaeration).

Optionally, a gerotor pump provides for flow from the case 101 to one or more fluid conditioning means (such as for example, a fluid cooling device, fluid filtration device, or deaeration device). Any of these fluid conditioning means may be provided externally or integrated with the unit. Here, the gerotor pump is shown in cross section to include inner gear 156a,b and outer gear 166a,b. Inner gear 156 rotates with shaft 130 while outer gear 166 is stationary. In the manner understood by anyone familiar with gerotor pumps, the relative rotation of inner gear 156 within outer gear 166 causes fluid to be drawn into the space between the gears due to a pressure difference created by a difference in the mesh of inner gear 156 with outer gear 166. Fluid is thereby drawn into intake passage 155 from case 101, and across to output passage 158 from where it may continue to a fluid conditioning means (not shown), then returning to the fluid-filled interior of case 101 through a return port that may be placed in any convenient location in the case.

In FIG. 1, for purpose of illustration, the gerotor pump and associated intake/output passages are packaged just outside the bearing of shaft 130, to rotate with the engine pump 90. They may instead be placed in an analogous position near the bearing of shaft 131 so that the gerotor is driven by the rotation of drive motor 91 instead of pump 90. Yet another option would include a gerotor (and associated passages) in both positions, to provide for maximum flow. Still another option would provide for an external pump, rather than an integrated gerotor pump, to provide flow through fluid conditioning means.

Figure 2:
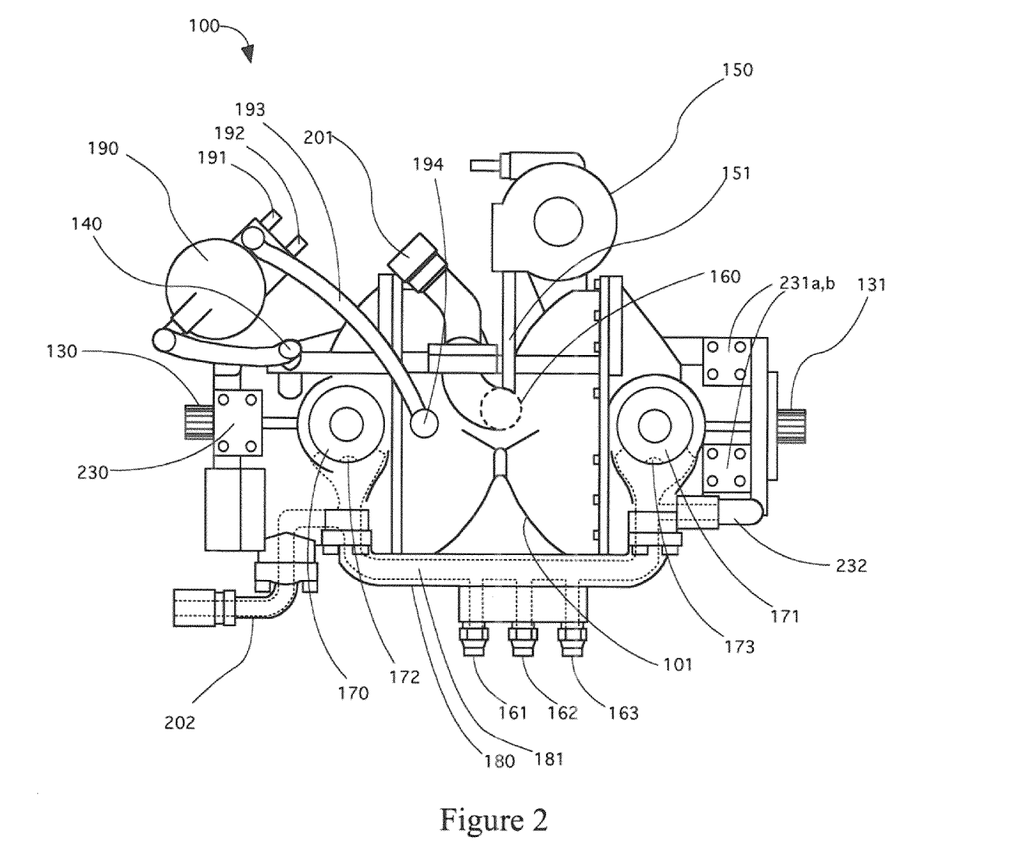
FIG. 2 is an exterior view of the hydraulic drive unit of the integrated drive module, detailing several external connections.

Referring now to FIG. 2, an exterior view of HDU 100 is shown. Pump trunnion 170 is the pivot for pump yoke 110 of FIG. 1. Similarly, motor trunnion 171 is the pivot for motor yoke 111 of FIG. 1. Low pressure case supply line 201 connects case 101 with a low pressure fluid supply such as a low pressure accumulator (i.e., low pressure reservoir, not shown). Low pressure case port 160 is formed where line 201 enters case 101.

High pressure supply line 202 connects HDU 100 (more specifically, the passage 181 in high pressure manifold 180) to a high pressure fluid supply such as a high pressure accumulator. By means of passage 181, high pressure supply line 202 is placed in fluid communication with high pressure port 172 on trunnion 170, which provides high pressure connection to a fluid-carrying yoke leg and ultimately to the cylinder barrel carried by yoke 110 (of FIG. 1). Similarly, passage 181 in high pressure manifold 180 also places high pressure port 173 on trunnion 171 into fluid communication with high pressure supply line 202. Relief valve 232 is also tied in to passage 181 to provide a pressure relief function. As pictured in FIG. 2, high pressure supply line 202 resides at the left side of the HDU, but it equally well could reside in the analogous position at the other side, essentially switching places with relief valve 232, if desired.

It may be seen that passage 181 conducts fluid among high pressure supply port 202, trunnion 170, and trunnion 171 as indicated generally by the dashed lines that outline passage 181. Additionally, passage 181 also provides high pressure fluid to several accessory ports (here exemplified as 161, 162, and 163) to be used to power vehicle accessories. More or fewer ports may be provided according to the application. Ports 161-163 may include pressure regulation means (not shown) to match the supply pressure coming from the port to that required of the accessory device to which it is connected.

Deaeration device 150 selectively receives low pressure fluid from case 101 by means of deaeration line 151, which may be valve regulated and/or driven by a pump. A deaeration device is any device that removes dissolved gases (such as nitrogen) from this flow, and returns the deaerated fluid to case 101 at any convenient return point in the case.

Similarly, fluid filter 190 selectively receives low pressure fluid from case 101 by means of gerotor pump outlet 140 and returns fluid to the case through a case port and line such as port 194 and line 193. Here, additional ports 191 and 192 are provided on the fluid filter 190 to provide an intake and return flow for a fluid cooler (not shown). After filtration and cooling, fluid may be returned to case 101 at any convenient return point in the case, shown here at port 194.

One or more front mount pre-set attachment points (such as pre-drilled front mount surface 230) may be provided to serve as attachment point(s) for installing the HDU to a chassis frame. Similarly, one or more rear mount pre-set attachment points (such as pre-drilled rear mount surfaces 231a, 231b) may be provided.

Figure 3:
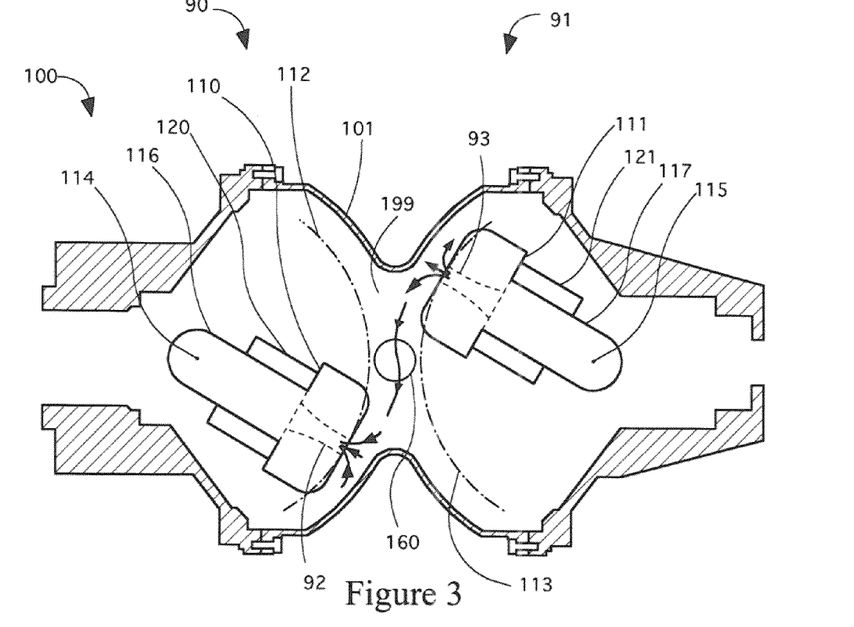
FIGS. 3-7 depict several operating modes of the invention, and highlight low pressure fluid flows associated with these modes.
Figure 4:
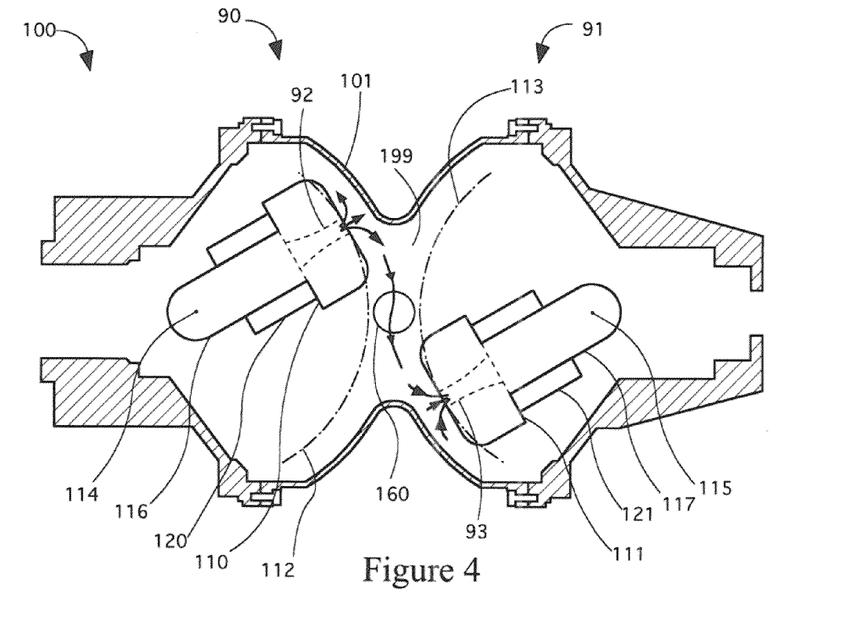

FIG. 3 and FIG. 4 illustrate the flow of low pressure fluid between the respective pump/motor yokes and within the interior of the fluid filled case, leading to a particular advantage of the invention. In each figure, case port 160 connects the fluid-filled case to a low-pressure source (such as a low-pressure reservoir or accumulator) so that fluid may be drawn from the low-pressure source into the case, or delivered from the case to the low pressure source, as needed in order to keep the case filled with fluid. For simplicity, high pressure flow is not depicted, and low pressure ports 92, 93 are depicted at the center of the yoke back plate.

Referring now to FIG. 3, pump/motor 90 is acting as a pump (to convert engine power to fluid power) and pump/ motor 91 is acting as a motor (to propel the vehicle). This is perhaps the most common operating mode of the invention. In acting as a pump, pump/motor 90 must intake low pressure fluid from the case through yoke low pressure port 92. In acting as a motor, pump/motor 91 must discharge low pressure fluid to the case at yoke port 93. Therefore the discharge flow of motor 91 acts to replace some portion of the fluid that is drawn from the case by pump 90. If the discharge flow is greater than the intake flow, there will be a net flow out of the case through case port 160 equal to the difference between the two flows. If the discharge flow is less than the intake flow, there will be a net flow into the case through case port 160, again equal to the difference between the two flows. The portion of intake flow to the pump that is replaced by discharge flow of the motor represents an amount of fluid that has avoided travel through the low pressure system outside of the case, thereby reducing overall fluid flow and saving energy.

Although pump/motors 90 and 91 are depicted as being stroked to an equal angle, suggesting an equal displacement, this does not necessarily indicate that the discharge flow of the pump is equal to the intake flow of the motor. If the HDU is installed in a hydraulic hybrid vehicle with series operation, pump 90 will operate at the speed of the engine, and motor 91 will operate at an unrelated speed that is determined by the speed of the vehicle and the transmission gear ratio. Therefore the two devices will likely generate different flow rates even if the stroke angles (displacements) are equal. Furthermore, the two integrated pump/motors could be of different maximum displacements, meaning that an equal stroke angle would not even indicate an equal displacement. Therefore, even though FIGS. 3 and 4 may seem to suggest that the flows are equal, this is not normally to be expected, and there will usually be some flow in or out of case port 160 to compensate for the difference.

Referring now to FIG. 4, in another potential operating mode, pump/motor 90 is acting as a motor, at a time when pump/motor 91 is acting as a pump. In a vehicular application, this would indicate that pump/motor 90 is starting the engine while pump/motor 91 is performing regenerative braking as the driver brakes. Although this operating mode may not be frequently encountered in a series hybrid application, it could be more common in other power transmission applications of the HDU (or if the roles of the two pump/motors were simply reversed). In acting as a motor, pump/motor 90 must discharge low pressure fluid into the case through yoke low pressure port 92. In acting as a pump, pump/motor 91 must intake low pressure fluid from the case at yoke port 93. Therefore the discharge flow of motor 90 acts to replace some portion of the fluid that is drawn from the case by pump 91. As with the previous example, the portion of intake flow to the pump that is replaced by discharge flow of the motor represents an amount of fluid that has avoided travel through the low pressure system outside of the case, thereby reducing overall fluid flow and saving energy.

Figure 5:
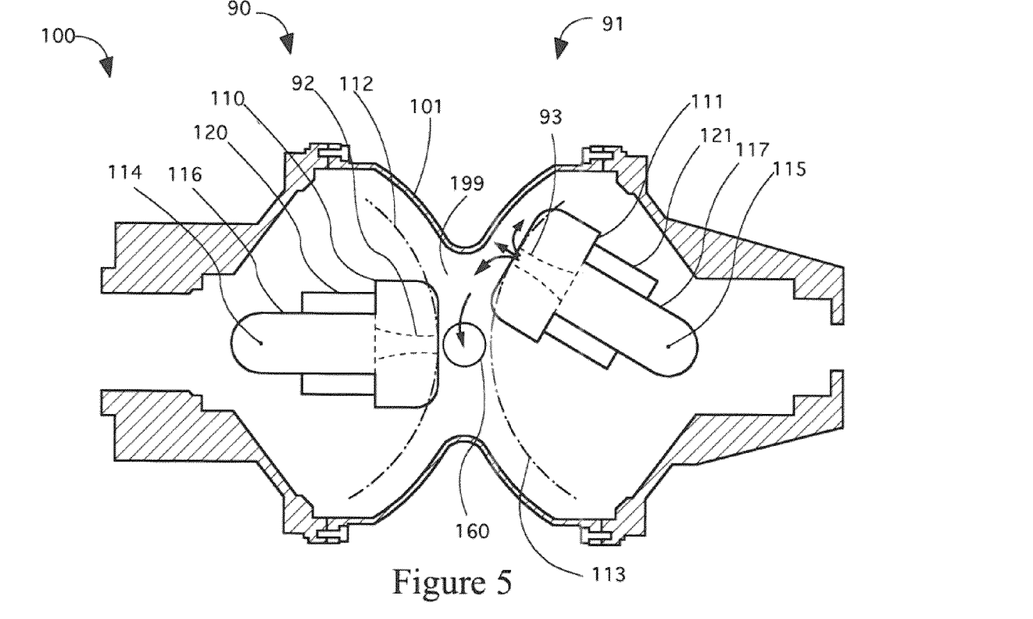
Figure 6:
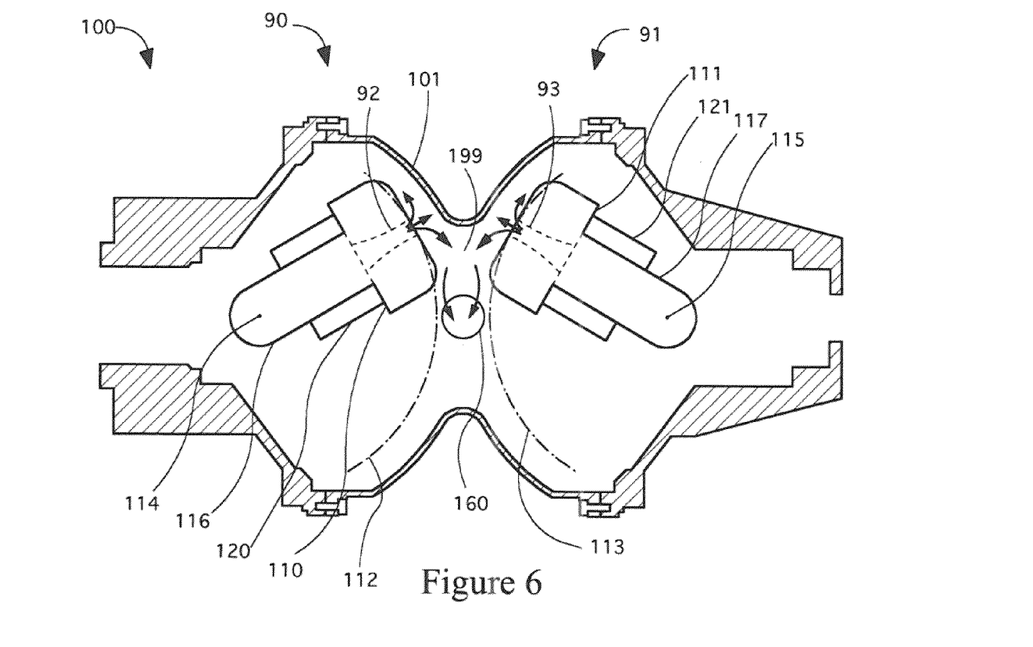
Figure 7:
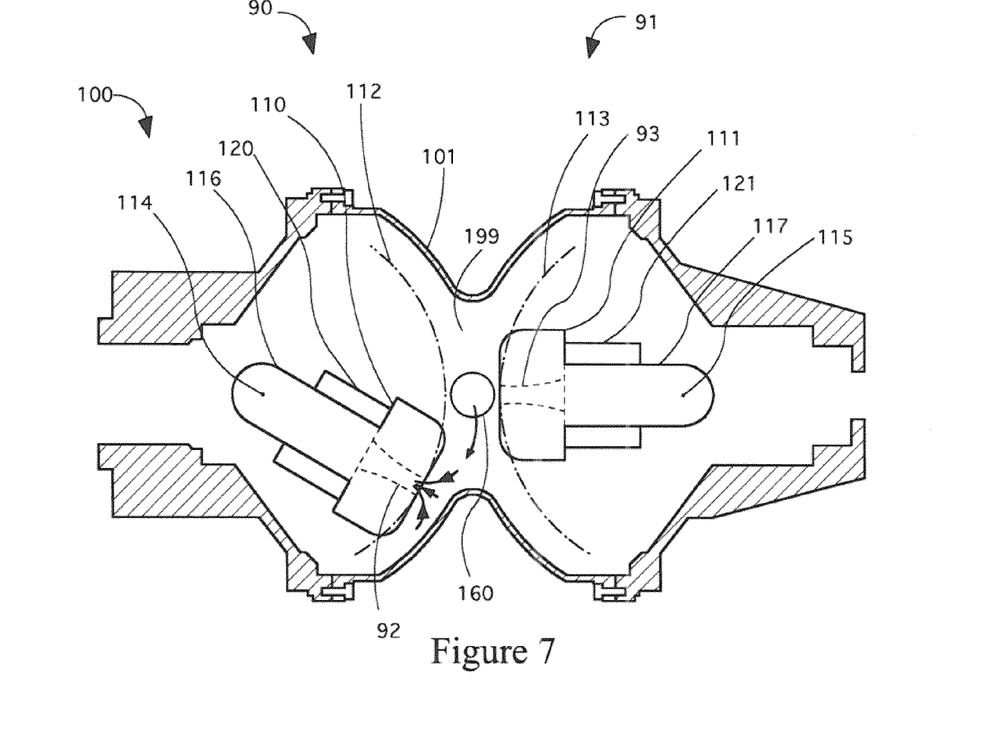

FIGS. 5-7 depict some other modes of operation, in which the low pressure flow through the HDU is similar to that of any wet-case bent-axis pump/motor (except for the possible presence of two yoke flows rather than only one), being a flow between the case port 160 and one or both yoke ports 92, 93.

For example, as depicted in FIG. 5, pump/motor 90 is idle, at zero displacement (e.g., because the engine is off) and pump/motor 91 is acting as a motor (to drive the vehicle). This is another common operating mode. Pump/motor 90 neither discharges nor intakes any fluid at port 92 because it is idle. However, pump/motor 91, operating as a motor, generates a discharge flow into the case through yoke port 93. This flow will naturally be offset by an equal flow out of the case through case port 160.

As another example, depicted in FIG. 6, pump/motor 90 is acting as a motor (to start the engine) and pump/motor 91 is also acting as a motor (to propel the vehicle). Because both pump/motors are operating as a motor, both must discharge fluid at yoke ports 92, 93. The net flow from ports 92, 93 will naturally be offset by an equal flow out of the case through case port 160.

As another example, depicted in FIG. 7, pump/motor 90 is acting as a pump (to convert power from the engine to fluid power) and pump/motor 91 is idle, at zero displacement (either because the vehicle is not moving, or the vehicle is moving but zero torque is demanded). In either case, because it is at zero displacement, pump/motor 91 neither discharges nor intakes any fluid at yoke port 93. However, pump/motor 90, operating as a pump, generates an intake flow out of the case through yoke port 92. This flow will naturally be offset by an equal flow into the case through case port 160.

Therefore one may now see the advantages of the invention in reducing the flow path of low pressure fluid whenever one pump/motor is acting as a pump and the other is acting as a motor. By eliminating the external routing of low pressure flow between two separate pump/motors, and instead having it occur within the common wet case of the HDU, packaging is improved by the elimination of external hoses. Efficiency is also improved by reducing the distance of travel for a portion of the low pressure flow.

Additionally, the low pressure side of the system may be maintained at a comparatively lower operating pressure, due to the smaller pressure drop between the low pressure reservoir and the fluid-filled case, compared to the greater pressure drop that would exist across the low pressure connections of two separate pump/motors and a low pressure manifold. Reduction in the low-side operating pressure reduces the potential for leakage at the shaft seals, and relaxes structural requirements for the case.

Figure 8:
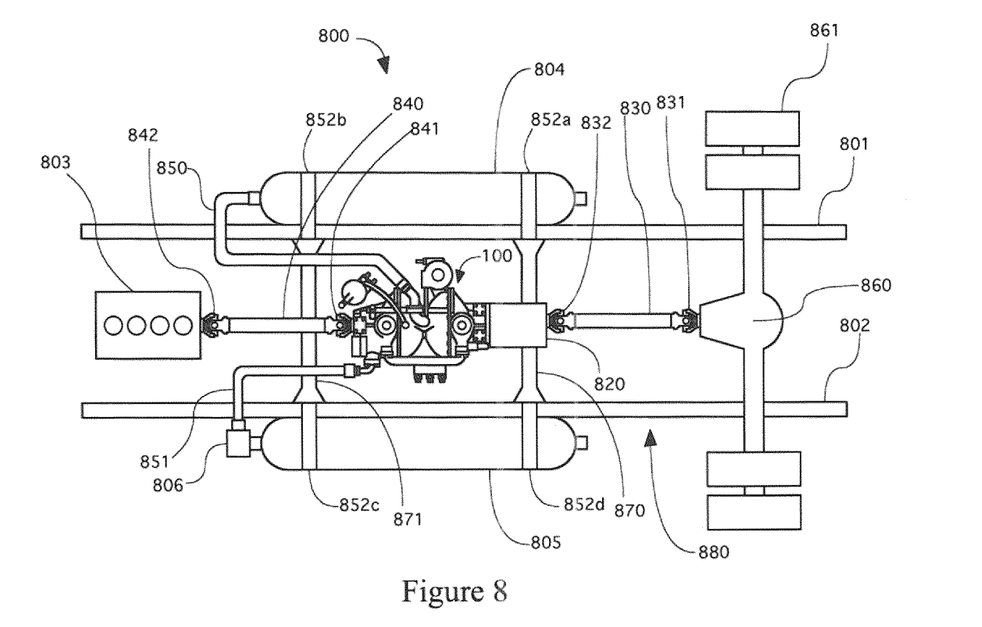
FIG. 8 depicts the integrated drive module with accumulators attached, as it might be installed on a representative vehicle chassis.

Referring now to FIG. 8, integrated hydraulic hybrid drive module 800 is seen in an example installation on a representative vehicle chassis. Vehicle chassis 880 includes frame rails 801 and 802, cross members 870 and 871, and differential/axle assembly 860 with a plurality of wheels 861. High pressure accumulator 805 and low pressure accumulator 804 are mounted on respective frame rails by means of straps 852*a-d* or similar connection means. Hydraulic drive unit (HDU) 100 may additionally be supported by one or more additional cross members (not shown). The arrangement seen here is for example only and may occur in many other configurations. For example, there may be multiple high pressure accumulators, multiple low pressure accumulators, a different transmission means or no transmission, a through-shaft pump/motor or torque converter instead of a transmission, different mounting means for the components, etc.

Engine 803 is mounted on the chassis in an ordinary manner by means of engine mounts or similar devices known in the art. HDU 100, as previously described, includes two pump/motors, one of which acts primarily as an engine pump and the other primarily a drive motor. Universal joint 841 is connected to the engine pump portion of HDU 100. Engine 803 thus provides mechanical power to HDU 100 through universal joint 842, engine shaft 840 and universal joint 841. Alternatively, the engine pump portion of HDU 100 could be connected and mounted directly to engine 803 without need for intermediary shafts and joints 840-842. Fluid thus pressurized is drawn from low pressure accumulator 804 through low pressure line 850, then when pressurized by the engine pump will travel through high pressure line 851 to be stored in high-pressure accumulator 805. Alternatively, some or all of the pressurized fluid may instead be conducted within the module (as previously described) to directly operate the drive motor rather than travel to high pressure accumulator 805.

The drive motor portion of HDU 100 is connected to transmission 820. Transmission 820 has been fitted to HDU 100 and may also be mounted on cross member 870 for support. Driven by the drive motor of HDU 100, transmission 820 then drives universal joint 832, drive shaft 830, and universal joint 831, which turns differential/axle assembly 860 and thereby turns wheels 861, propelling the vehicle.

As is common in vehicle applications, engine shaft 840 and/or drive shaft 830 may reside at an angle with respect to the components they connect to, rather than being perfectly parallel with the longitudinal axis of the vehicle. These angles will vary depending on the specific mounting locations of engine 803 and HDU 100, and the offset of the output shaft of transmission 820 relative its input shaft. It is well understood in the art that drive shafts having universal joints should ideally be limited to a bend angle of less than approximately 6 degrees at the joint. The mounting of each component upon the chassis may be adjusted so as to limit the angles to an acceptable range. The specific mounting location of each component will therefore vary with the specific chassis on which the system is mounted.

Optionally the IDM may be packaged on a removable support structure (RSS). The RSS is provided to facilitate assembly, fluid charging, gas purging, system verification testing, and installation on a chassis. Generally, the HDU resides on the RSS between the low pressure accumulator to one side and the high pressure accumulator to the other side. The RSS supports rigid or semi-rigid connection between the accumulators and the HDU, and also facilitates lateral (horizontal) and elevational (vertical) movement of the IDM so that it may be easily moved around a factory floor and raised/lowered vertically as necessary to be connected to the host chassis. For example, the RSS may include a platform on which the IDM is mounted, the platform having for example a plurality of wheels or casters (i.e., "means for transporting") by which the platform may be carted around on a factory floor. Each wheel may additionally be mounted (for example) on a hydraulic jack, screw jack, or scissor jack (i.e., "elevation means") so that the platform may be raised to a height appropriate for installation of the components on a host chassis. For example, the platform could be raised by the elevation means to a height such that mounting points on the IDM could be brought into vertical proximity to corresponding mounting points on the host chassis, while the wheels provide for movement into horizontal proximity. Alternatively, a forklift could be used to transport and raise the platform, with orifices provided with the RSS to accommodate forks of a forklift for safe lifting and moving.

Figure 9:
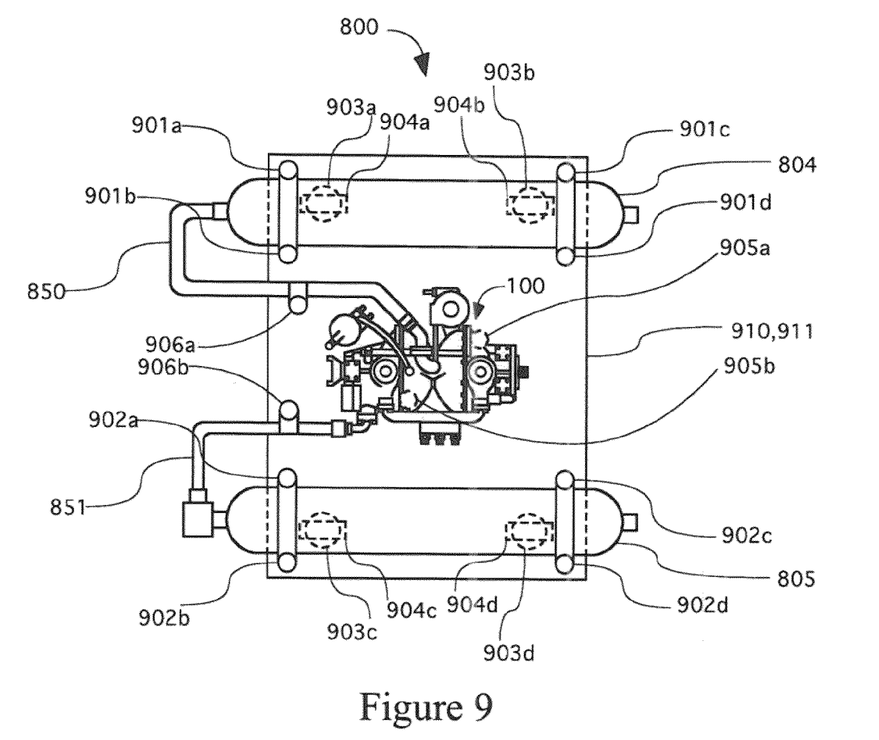
FIG. 9 is a top view of the integrated drive module as it might be packaged on a removable support structure.
Figure 10:
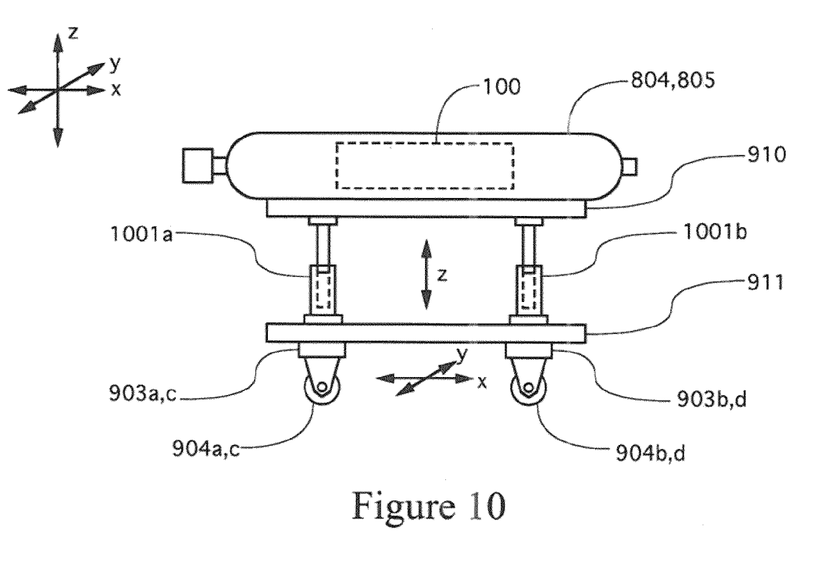
FIG. 10 is a side view of the removable support structure and module of FIG. 9.

Referring now to FIGS. 9 and 10, an example of a RSS with IDM installed is shown. Platform 910 provides a plurality of pre-set attachment points by which the various components of the IDM are removably connected to platform 910 for transport. In the example shown, these connection points are: 901*a-d* for accumulator 804, 902*a-d* for accumulator 805, 905*a-b* for HDU 100, and 906*a-b* for hoses 850, 851. The depicted pre-set attachment points are shown for example only, as anyone skilled in the art may now anticipate other connection points than those specifically shown here. In addition to securing the components of the IDM to the platform 910, any or all of these connection points may optionally also be reused to connect the respective components to the host chassis. For example, connection points 905*a,b* might be the same as or analogous to the front/rear mount surfaces 230 and 231*a,b* of FIG. 2, being functional not only for connection to the RSS but also for connection to the host chassis on which the IDM is installed.

To move the platform and the connected IDM components laterally on a factory floor (directions x and y as seen in FIG. 10), caster assemblies 903*a-d* having respective wheels 904*a-d* may be mounted to the bottom surface of platform 910.

Referring now to FIG. 10, optionally a second platform 911 may be provided generally below platform 910, the second platform 911 now hosting the aforementioned caster assemblies 903*a-d* and wheels 904*a-d*. Elevation means (shown here as hydraulic jacks 1001*a,b*) may be provided between platforms 910, 911 so as to provide for vertical movement (direction z) of platform 910 and the respective connected IDM components. Alternatively, platform 911 may be eliminated and each of the respective casters then mounted on the bottom of each respective elevation means.

Figure 11:
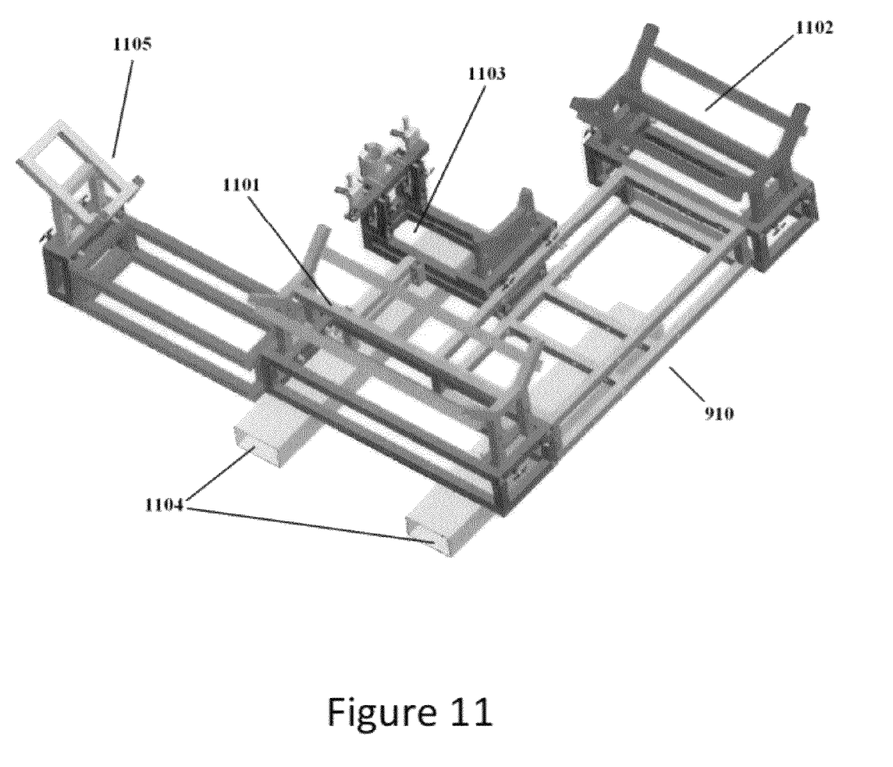
FIG. 11 depicts another embodiment of the removable support structure.

Other variations will be apparent to those skilled in the art. As one example, referring to FIG. 11, the RSS platform 910 is shown with orifices 1104 ("tubes") to accommodate forks of a forklift for moving and raising the RSS. Structures 1101 and 1102 are provided to accommodate accumulators 804 and 805, and receptacle 1103 for accommodating HDU 100. Support 1105 is also provided to accommodate a cooling device. In this example, platform 911 is eliminated.

Either or both of platforms 910, 911 may be provided in any of many different forms as appropriate to the application. For example, either or both platform could be any of: a solid metal plate, a metal grate or grid, a wooden pallet, a molded plastic structure, or any other form having sufficient strength, stiffness, or other structural qualities necessary to provide for connection points and/or mounting of wheels, casters, and elevation means.

On installation of the IDM to a host chassis, one or more structural cross members may substitute for, or be attached to, existing chassis cross members in order to provide additional support for the IDM components on the host chassis. The IDM may also include overhead supports for the accumulators. In a preferred embodiment the overhead supports are mounted to the frame rails, with the accumulators hanging from the supports outside of the frame rails. The overhead supports are optionally provided with a means to adjust the lateral position of the supports and of the accumulators, so as to fit various chassis frame rail configurations.

The invention claimed is:

1. An integrated drive module for a motor vehicle, comprising a hydraulic drive unit, wherein the hydraulic drive unit comprises:

a case filled with working fluid;

a low pressure supply port placing the case in fluid communication with a low pressure fluid source;

a high pressure supply port placing the hydraulic drive unit in fluid communication with a high pressure fluid source;

first and second bent-axis pump/motors, having respective first and second yokes pivoting within said case, said yokes each carrying a respective cylinder barrel, and each yoke providing low pressure fluid supply to its respective cylinder barrel by means of a respective low pressure port; said low pressure port being in fluid communication with the fluid-filled interior of said case, respective low pressure ports being thereby in fluid communication with each other;

an input shaft for connection of the first pump/motor to a mechanical power source; and an output shaft for connection of the second pump/motor to a mechanical power output.

2. The integrated drive module of claim 1, wherein:
at least one of the pump/motors is an over-center bent-axis pump/motor.

3. The integrated drive module of claim 2, wherein:
the first and second pump/motors are over-center bent-axis pump/motors; and
for both the first and second pump/motors, the yoke is stroked toward a first side of the case when that pump/motor is in pump mode, and toward a second (opposite) side of the case when that pump/motor is in motor mode.

4. The integrated drive module of claim 3, wherein the first and second pump/motors are stroked to opposite sides of the case when the first pump/motor is in pump mode and the second pump/motor is in motor mode.

5. The integrated drive module of claim 1, wherein:
the high-pressure fluid source comprises one or more high-pressure accumulators; and
the low-pressure fluid source comprises one or more low-pressure accumulators.

6. The integrated drive module of claim 1, additionally comprising:
one or more additional pump/motors sharing said case with the first and second pump/motors.

7. The integrated drive module of claim 1, additionally comprising:
a high-pressure fluid manifold integrated with the structure of the module and connecting the first and second pump/motors with the high pressure supply port.

8. The integrated drive module of claim 7, additionally comprising:
one or more high pressure accessory ports integrated with the structure of the module and connecting the high pressure manifold with one or more respective accessory devices.

9. The integrated drive module of claim 8, additionally comprising:
one or more pressure regulators regulating the pressure of said high pressure accessory ports.

10. The integrated drive module of claim 1, additionally comprising:
one or more fluid filters for filtration of low pressure fluid, integrated with the structure of the module.

11. The integrated drive module of claim 1, additionally comprising:
a fluid deaerating device for deaeration of low pressure fluid, integrated with the structure of the module.

12. The integrated drive module of claim 1, additionally comprising:
at least one gerotor pump integrated with the module providing flow to one or more fluid conditioning means.

13. The integrated drive module of claim 1, additionally comprising:
a mating surface surrounding said output shaft so as to provide a surface for mounting of a power transmission means to the module.

14. The integrated drive module of claim 1, wherein the first and second bent-axis pump/motors are positioned back-to-back and at least partially within the fluid-filled case.

15. The integrated drive module of claim 14, wherein the low pressure ports comprise openings in back plates of the first and second bent-axis pump/motors.

16. The integrated drive module of claim 1, additionally comprising:
a removable support structure supporting the integrated drive module and associated components, said components including any combination of: one or more high-pressure accumulators; one or more low-pressure reservoirs; one or more fluid conducting hoses; or one or more hydraulically powered accessory devices.

17. The integrated drive module of claim 16, wherein:
said removable support structure comprises pre-set attachment points by which the drive module and/or said associated components may be securely attached to a vehicle chassis.

18. The integrated drive module of claim 16, wherein:
said removable support structure comprises means for transporting the integrated drive module and any said associated components.

19. The integrated drive module of claim 16, wherein:
said removable support structure comprises elevation means for raising the integrated drive module and any said associated components to facilitate attachment to a vehicle chassis.

20. An integrated drive module for a motor vehicle, comprising a hydraulic drive unit, wherein the hydraulic drive unit comprises:
a low pressure supply passage placing the integrated drive module in fluid communication with a low pressure fluid source;
a high pressure supply passage placing the integrated drive module in fluid communication with a high pressure fluid source;
first and second bent-axis pump/motors having respective first and second yokes pivoting within a common case, said yokes each carrying a respective rotating group, and each yoke providing low pressure fluid supply to its respective rotating group by means of a low-pressure manifold connecting the low pressure supply to the low pressure yokes of first and second pump/motors;
a high-pressure manifold connecting the high pressure supply of the first pump/motor with said high pressure fluid source, and connecting the high pressure supply of the second pump/motor with said high pressure fluid source;
an input shaft for connection of the first pump/motor to a mechanical power source; and
an output shaft for connection of the second pump/motor to a mechanical output.

21. The integrated drive module of claim 20, additionally comprising:
a removable support structure supporting the integrated drive module and associated components, said components including any combination of: one or more high-pressure accumulators; one or more low-pressure reservoirs; one or more fluid conducting hoses; or one or more hydraulically powered accessory devices.

22. The integrated drive module of claim 21, wherein:
said removable support structure comprises pre-set attachment points by which the drive module and/or said associated components may be securely attached to a vehicle chassis.

23. A method of installing a hydraulic hybrid drivetrain on a motor vehicle, comprising:
placing the components of an integrated hydraulic hybrid drive module on a common removable support structure, wherein the components of the integrated hydraulic hybrid drive module comprise a high pressure accumulator, a low pressure reservoir, a hydraulic drive unit, and associated hoses, and the hydraulic drive unit comprises an engine pump and hydraulic drive motor positioned in a common case;

positioning the integrated hydraulic hybrid drive module and removable support structure underneath the motor vehicle;

raising the integrated hydraulic hybrid drive module and removable support structure;

attaching the integrated hydraulic hybrid drive module or removable support structure to frame rails of the motor vehicle;

connecting an input shaft of the engine pump to a mechanical power source of the motor vehicle;

connecting an output shaft of the hydraulic drive motor to a mechanical power output of the motor vehicle; and removing the removable support structure.

24. The method of claim 23, wherein the attaching step comprises attaching the integrated hydraulic hybrid drive module to the motor vehicle using pre-set attachment points.

* * * * *